United States Patent
Brombach et al.

(10) Patent No.: US 10,266,134 B2
(45) Date of Patent: Apr. 23, 2019

(54) VEHICLE ACCESSORY POWER MANAGEMENT

(71) Applicant: Ford Global Technologies, LLC, Dearborn, MI (US)

(72) Inventors: Ronald Patrick Brombach, Plymouth, MI (US); James Michael Weinfurther, Farmington, MI (US); Hanyang B Chen, Canton, MI (US); David J Dainelis, Middleville, MI (US); Michael J Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/613,059

(22) Filed: Jun. 2, 2017

(65) Prior Publication Data
US 2018/0345887 A1 Dec. 6, 2018

(51) Int. Cl.
*B60R 16/033* (2006.01)
*B62D 5/04* (2006.01)
*B60R 16/03* (2006.01)
*B60N 2/56* (2006.01)
*B60N 2/02* (2006.01)

(52) U.S. Cl.
CPC .......... *B60R 16/033* (2013.01); *B60N 2/0224* (2013.01); *B60N 2/5678* (2013.01); *B60R 16/0307* (2013.01); *B62D 5/0457* (2013.01); *B60Y 2300/18016* (2013.01); *B60Y 2300/192* (2013.01); *B60Y 2400/61* (2013.01)

(58) Field of Classification Search
CPC . B60R 16/033; B60R 16/0307; B60N 2/5678; B60N 2/0224; B62D 5/0457; B60Y 2400/61; B60Y 2300/18016; B60Y 2300/192

USPC ....................................................... 123/179.3
See application file for complete search history.

(56) References Cited

U.S. PATENT DOCUMENTS

| 6,675,088 | B2 * | 1/2004 | Miki | F02D 41/042 |
| | | | | 123/198 DB |
| 6,817,329 | B2 * | 11/2004 | Buglione | B60K 6/48 |
| | | | | 123/179.3 |
| 7,389,842 | B2 | 6/2008 | Inoguchi et al. | |
| 7,702,450 | B2 * | 4/2010 | Pfohl | E02F 9/2246 |
| | | | | 123/198 DB |

(Continued)

FOREIGN PATENT DOCUMENTS

| GB | 2536559 A | 9/2016 |
| JP | 03141112 U | 4/2008 |
| JP | 2011174415 A | 9/2011 |

OTHER PUBLICATIONS

Search Report dated Nov. 9, 2018 for GB Patent Application No. GB 1808956.5 (4 pages).

*Primary Examiner* — Hieu T Vo
*Assistant Examiner* — Arnold Castro
(74) *Attorney, Agent, or Firm* — Frank Lollo; Neal, Gerber & Eisenberg LLP; James P. Muraff

(57) ABSTRACT

System and method are disclosed for vehicle accessory power management. An example vehicle includes an engine configured to operate in a start-stop mode, and a power management system. The power management system is configured to receive an input requesting use of a vehicle accessory in an accessory mode, and responsive to the input, reduce an electrical load, disable the start-stop mode, and enable use of the accessory mode.

16 Claims, 3 Drawing Sheets

(56) References Cited

U.S. PATENT DOCUMENTS

| | | | |
|---|---|---|---|
| 8,256,399 B2* | 9/2012 | Gamache | F02N 11/0803 |
| | | | 123/179.4 |
| 8,316,810 B2 | 11/2012 | Holz | |
| 8,727,067 B2 | 5/2014 | Gibson et al. | |
| 8,875,857 B2 | 11/2014 | Asplund | |
| 9,284,896 B2 | 3/2016 | Atluru | |
| 2015/0105974 A1 | 4/2015 | Kleve et al. | |
| 2015/0149014 A1 | 5/2015 | Kees | |
| 2015/0258948 A1 | 9/2015 | Planas et al. | |
| 2016/0047471 A1 | 2/2016 | Lundberg | |
| 2016/0369733 A1 | 12/2016 | Dokras | |
| 2017/0033717 A1 | 2/2017 | Ansbacher et al. | |
| 2018/0043878 A1* | 2/2018 | Khafagy | B60W 20/15 |

* cited by examiner

VEHICLE ACCESSORY POWER MANAGEMENT

TECHNICAL FIELD

The present disclosure generally relates to vehicle accessory power management, and, more specifically, systems and methods for managing power consumption in a vehicle with a start-stop system.

BACKGROUND

Modern vehicles may include electronic systems that require a base level of available power to operate. For example, many vehicles include climate control systems, power windows and locks, connectivity systems (GPS, Bluetooth, etc.) and electronic power assisted steering (EPAS). Further, some vehicles may include a start-stop mode, in which the engine turns off and on to conserve fuel.

Many vehicles may also include the ability to attach powered accessories such as snow plows or other devices.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle power management in the presence of an attached accessory. An example disclosed vehicle includes an engine configured to operate in a start-stop mode, and a power management system. The power management system is configured to receive an input requesting use of a vehicle accessory in an accessory mode, and, responsive to the input, reduce an electrical load, disable the start-stop mode, and enable use of the accessory mode.

An example disclosed method includes receiving, by a power management system for a vehicle, an input requesting use of a vehicle accessory in an accessory mode. The method also includes, responsive to the input, reducing an electrical load, disabling a start-stop mode of an engine of the vehicle, and enabling use of the accessory mode.

A third example may include means for receiving, by a power management system for a vehicle, an input requesting use of a vehicle accessory in an accessory mode. The third example may also include means for, responsive to the input, reducing an electrical load, disabling a start-stop mode of an engine of the vehicle, and enabling use of the accessory mode.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
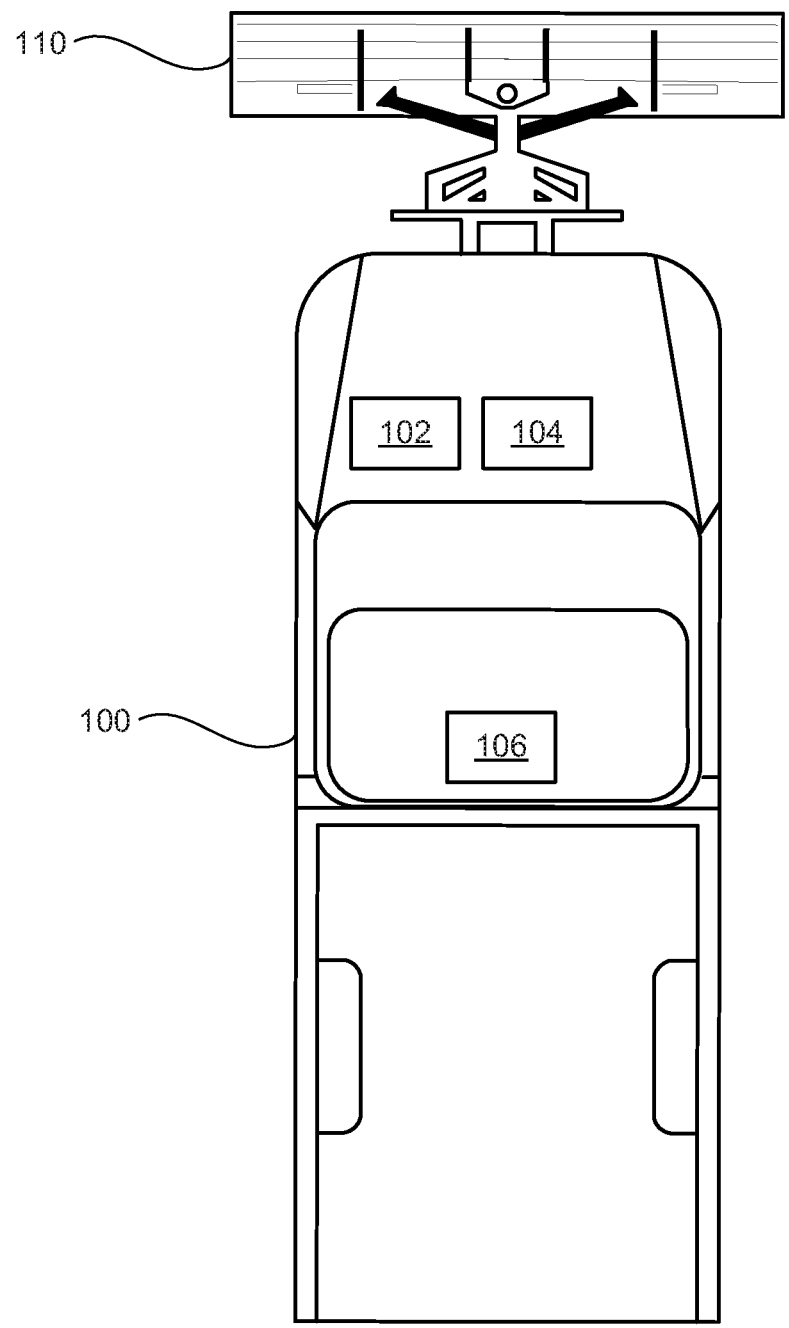
FIG. 1 illustrates an example vehicle and accessory according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to vehicle power management, and, more specifically, systems and methods for managing power consumption in a vehicle with a start-stop system.

Vehicles may include one or more electronic systems which require a threshold level of power to operate. For instance, some vehicles may include power adjusted seats, computing systems and displays, heated seats and steering wheel, lights, external and internal relays, and more. Further, some vehicles may include electronic power assisted steering (EPAS) which may require, in some examples, seventy-five amps of current to operate effectively during certain operating conditions.

One particular system which some vehicle may employ is a start-stop mode for the engine. The start-stop mode may enable the vehicle engine to turn off and on automatically (for instance when stopped at a stop light). This may allow the vehicle to conserve fuel and reduce emissions.

Vehicles may also include one or more powered accessories, such as a snow plow or aftermarket device, which may require a substantial amount of power to operate.

In some cases, a driver of a vehicle may attempt to use multiple systems at the same time, which may overload the vehicle power system, causing one or more systems or devices to malfunction, operate ineffectively, or otherwise experience issues. For instance, a vehicle may be operating in a start-stop mode, may have the heated seats and air heating units running, may have all the vehicle lights on, and the driver may wish to operate an attached snow plow. All these devices and systems may require power, and the combination of all of them may draw more power than the vehicle battery and alternator can provide.

The result is that one or more systems may receive insufficient power. This can be particularly problematic where the EPAS system receives insufficient power, because the vehicle may lose the ability to steer, creating safety concerns. Further, insufficient power to the start-stop system at an inopportune time can drain the battery, causing the engine to remain off. The vehicle may then become stranded.

With these concerns in mind, example vehicles, systems, devices, and methods disclosed herein may provide the ability to manage power consumption of the vehicle and any accessories.

An example vehicle may include an engine configured to operate in a start-stop mode. Operating in the start stop mode may include controlling the engine to turn off and on automatically, for example by turning off when the vehicle is stopped, and restarting when a driver of the vehicle releases the brake pedal. Restarting the engine after it has been turned off may require a high current for a short amount of time.

The example vehicle may also include a power management system, and an accessory such as a snow plow. The power management system may be configured to receive an input requesting use of the accessory in an accessory mode. For instance, a driver may press a button or select an option via a vehicle user interface as a request to enter a snow plow mode. In the accessory mode (e.g., the snow plow mode), additional features may be available, such as for control of the accessory (e.g., raise, slower, or change the angle). These additional features may require increased power from the battery and/or alternator of the vehicle.

Responsive to receiving the input request, the power management system may be configured to reduce an electrical load of the power management system, disable the start-stop mode, and enable use of the accessory mode.

Reducing the electrical load may include disabling the use of one or more electrical systems of the vehicle, including disabling the power seats, the heated seats, the vehicle climate control, the fog lamps or other vehicle lights, and the AC/DC inverter of the vehicle. This reduction may allow the accessory to draw enough power to operate, while still maintaining enough output capacity of the power management system to operate the EPAS.

Disabling the start stop mode may remove any concern that the engine will not be able to restart due to an excessive power draw by the vehicle accessory. Further, disabling the start-stop mode may ensure that when the accessory is in use, the vehicle battery and alternator are both available, such that a maximum power output is available.

In some examples, reducing the electrical load may include determining a power requirement of the accessory (e.g., a maximum, average, or other power requirement). The example may then include reducing the electrical load by an amount such that the available power output of the power management system is greater than the power requirement of the accessory.

In some examples, reducing the electrical load may include determining a power requirement of the EPAS (e.g., a maximum, average, or other power requirement). The example may then include reducing the electrical load by an amount such that the available power output of the power management system is greater than the power requirement of the EPAS.

Still further examples may include determining a power requirement of the EPAS and the accessory, and reducing the electrical load based on the combined power requirement.

In some examples, the power management system may receive the input requesting use of the accessory while the engine is off, either while vehicle is on (i.e., before the engine is started initially) or while the vehicle is stopped and the start-stop mode is on (i.e., the engine is in an off phase of the start-stop mode). In these cases, the power management system may be configured to determine that the engine is off, and responsively start the engine. This may allow the power management system to ensure that both the battery and the alternator are available to power the vehicle systems and the accessory.

In still further examples, the power management system may be configured to determine that the vehicle has been cycled off and on, and responsively re-activate or re-enable the start-stop mode.

FIG. 1 illustrates an example scenario involving a vehicle 100 according embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include an engine 102, a power management system 104, and an electrical load 106. Vehicle 100 is also shown with an accessory 110 attached to a front end of the vehicle 100. The accessory in FIG. 1 is a snow plow, but it should be understood that other accessories are possible as well.

Engine 102 may be configured to operate in a start-stop mode. When the start-stop mode is disabled, the engine may function as a typical engine functions. For instance, by turning on when the vehicle is started, and turning off when the vehicle is shut off. When the start-stop mode is disabled, the engine may not automatically turn on and off.

Alternatively, when the start-stop mode is enabled, the engine 102 (and/or one or more engine control systems) may function by receiving input from one or more vehicle systems to determine whether to automatically turn off and on. For instance, the engine may shut off when the vehicle is stationary for a period of time, such as when vehicle 100 is waiting at a stoplight. The engine may then automatically turn on based on one or more inputs, such as when the driver releases a brake pedal, after an amount of time has elapsed, or some other signal is received. This restarting of the engine may require power from the battery.

When the engine operates with the start-stop mode disabled, the various electrical systems of the vehicle may draw power from the battery, as well as from the alternator (powered by the engine). However, when the engine operates in the start-stop mode and the engine is automatically turned off, the battery may be the only source of power for the electrical systems.

In some examples, engine 102 may be controlled by the power management system 104 and/or one or more other systems or devices of vehicle 100. Power management system 104 of vehicle 100 may be configured to carry out one or more functions described herein. For example. power management system 104 may be configured to receive input via user interface, such as user interface 224 described below with respect to FIG. 2. The input may come from a driver or other occupant of vehicle, and may be a request to operate accessory 110, or a request to enter an accessory mode or otherwise enable the accessory.

In some examples, power management system 104 may also be configured to receive requests to operate, enable, or disable the use of one or more electrical loads 106 or other systems or devices of vehicle 100.

The electrical loads 106 of vehicle 100 may include power adjustment controls for seats of the vehicle, heating and cooling systems, HVAC, climate control, heated seats, fog lamps, other lights, cameras, inverters, internal and external relays, and more.

Power management system 104 may be configured to reduce the electrical load responsive to receiving an input requesting use of the vehicle accessory 110. Reducing the electrical load may include (i) turning off one or more electrical systems, (ii) disabling one or more electrical systems, and/or (iii) reducing an amount of power available to one or more electrical systems.

Some examples may include reducing the electrical load by a particular amount. For instance, the power management system may include a battery and an alternator, and may have a combined power output capacity. The electrical load may be reduced until it is below a particular threshold amount of the combined power output capacity. Alternatively, each electrical system may have a particular power draw amount, and the load may be reduced until a combined power draw of the active, enabled, or "on" electrical systems is below a threshold. The threshold may be a percentage of the combined power output capacity of the power management system 104.

In some examples, the power management system may be configured to determine a power requirement of the accessory 110, the EPAS, and/or one or more other electrical systems or devices. The power requirement may be a maximum power requirement, an average power requirement, or some other metric. The electrical load may be reduced based on this power requirement, such as by reducing the electrical load until there is enough power output capacity for the accessory, EPAS, and/or other system(s) to function.

In some examples, power management system 104 may be configured to start the engine (if it is off) and disable the start-stop mode responsive to the input. This may enable the vehicle to have the battery and the alternator on, in order to provide the maximum power output available to the power management system.

In some examples, the electrical load 106 may include a plurality of systems and/or devices, which may be prioritized or ranked. The power management system 104 may reduce the electrical load based on this ranking.

Figure 2:
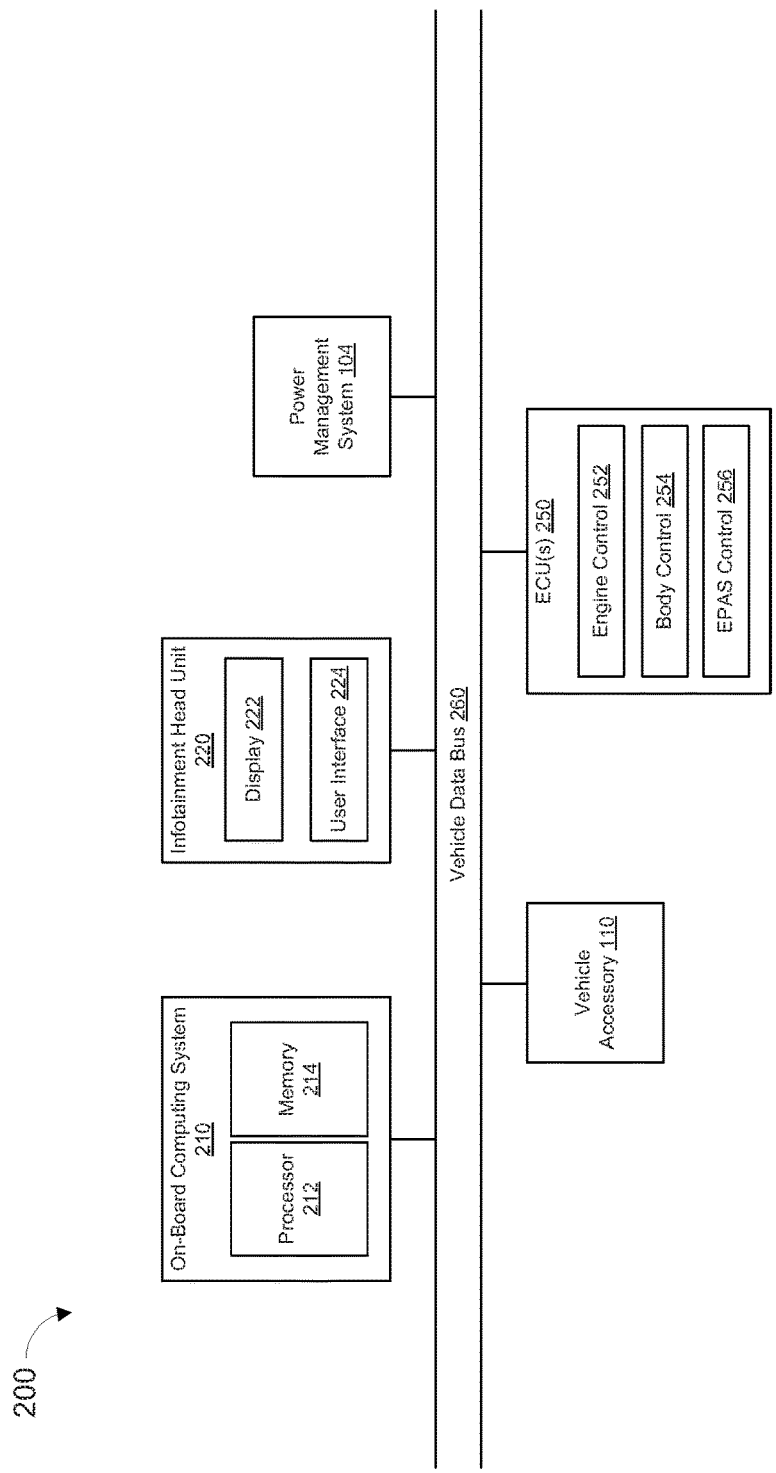
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include an on-board computing system 210, infotainment head unit 220, power management system 104, vehicle accessory 110, electronic control unit(s) 250, and vehicle data bus 260.

The on-board computing system 210 may include a microcontroller unit, controller or processor 212 and memory 214. The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 210. Additionally, the infotainment head unit 220 may display the infotainment system on, for example, a center console display of vehicle 100.

Power management system 104 may include a dedicated processor and/or memory, or may share a processor and/or memory with on-board computing system 210. Power management system may be configured to carry out the functions or actions described herein.

Vehicle accessory 110 may be a snow plow (as in FIG. 1), but may alternatively include other vehicle accessories. Accessory 110 may be configured to operate in an accessory mode, in which one or more functions, abilities, or actions are available to the accessory. This may include moving, changing the angle, raising, lowering, or powering lights of the accessory. Other functions are possible as well.

The ECUs 250 may monitor and control subsystems of vehicle 100. ECUs 250 may be the electrical load 106 discussed with reference to FIG. 1. As such, one or more ECUs may be enabled, disabled, or otherwise modified to reduce a power draw of the ECU. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors 130. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the on-board computing system 210, infotainment head unit 220, power management system 104, vehicle accessory 110, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3:
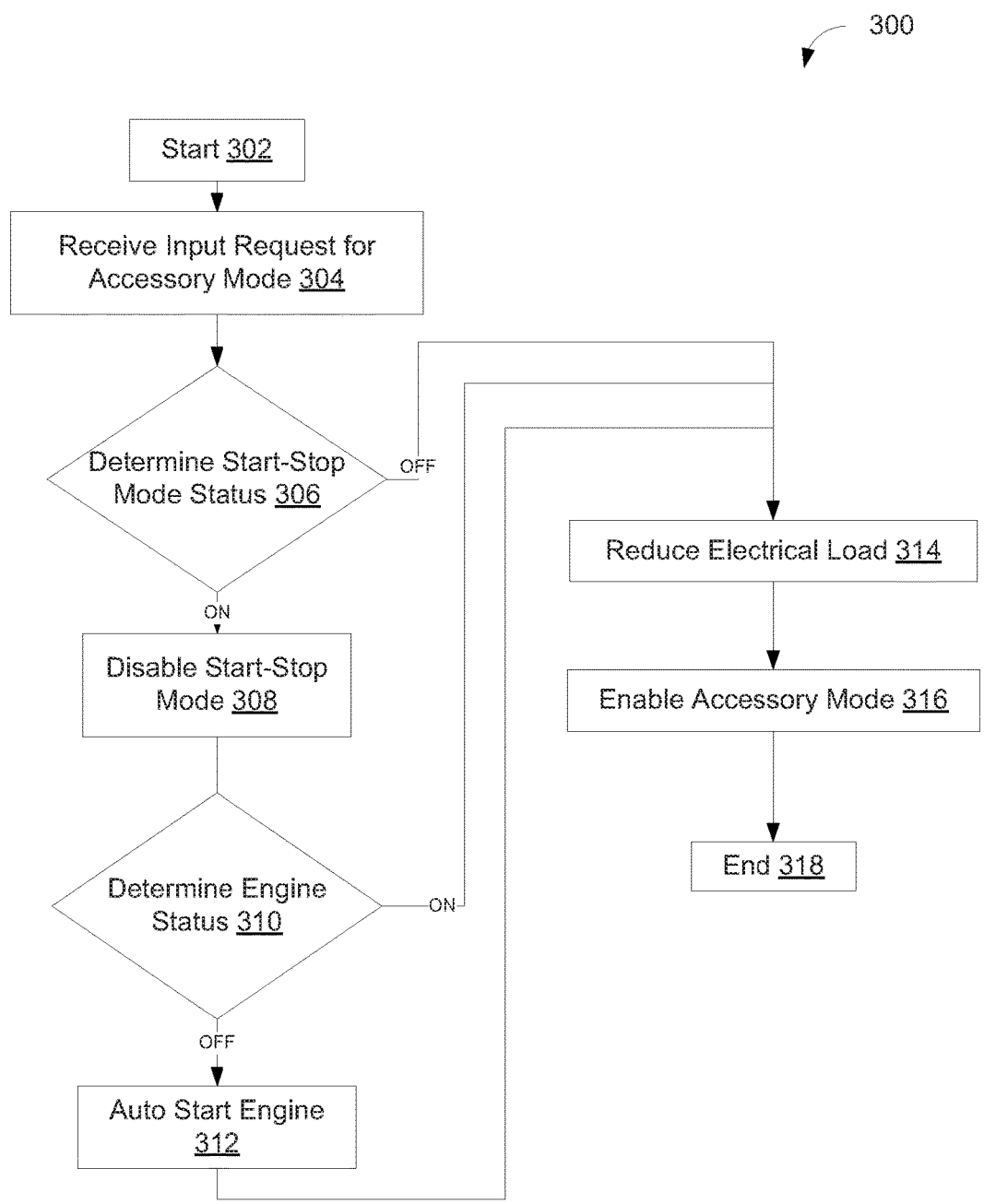
FIG. 3 illustrates a flowchart of an example method according to embodiments of the present disclosure.

FIG. 3 illustrates a flowchart of an example method 300 according to embodiments of the present disclosure. Method 300 may enable a vehicle to manage the power consumption of one more systems. The flowchart of FIG. 3 is representative of machine readable instructions that are stored in memory (such as memory 214) and may include one or more programs which, when executed by a processor (such as processor 212) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, the method may include receiving an input request for the accessory mode. This input request may come from a user via a user interface such as user interface 224.

At block 306, method 300 may include determining a status of the start-stop mode. This status may be either enabled (on) or disabled (off). If the start-stop mode is on, method 300 may include disabling the start-stop mode at block 308. But if the start-stop mode is off or already disabled, method 300 may include proceeding to block 314.

At block 310, method 300 may include determining an engine status responsive to receiving the input requesting the accessory mode. If the engine status is off, method 300 may include automatically starting the engine at block 312. Automatically starting the engine may include performing one or more safety checks or hazard checks to determine whether it is safe to start the engine. But if the engine status is on, method 300 may include proceeding to block 314.

Method 300 may also include determining a power requirement for a vehicle accessory. The power requirement may be in the form of a required voltage, current, or other electrical metric. At block 314, method 300 may include reducing the electrical load. As described above, this may include disabling various electrical systems and devices powered by the battery and/or alternator of the vehicle. Further, the amount of reduction in electrical load may depend on the determined power requirement of the accessory, a power requirement of one or more other systems (e.g., EPAS), or some other factor.

Method 300 may also include determining whether an available power is larger than the amount required by the accessory. If the available power is not large enough, method 300 may return to block 314, and the electrical load may be further reduced. But if the available power is large enough, method 300 may proceed to block 316 in which the accessory mode is enabled. Method 300 may then end at block 318.

Example methods may further include determining that the vehicle has been cycled off and on again, and responsively enabling the start-stop mode.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    an engine configured to operate in a start-stop mode; and
    a power management system configured to:
        receive an input requesting use of a vehicle accessory in an accessory mode; and
        responsive to the input, reduce an electrical load, disable the start-stop mode, and enable use of the accessory mode.

2. The vehicle of claim 1, wherein the start-stop mode comprises stopping the engine while the vehicle is at rest, and restarting the engine upon release of a brake pedal of the vehicle.

3. A vehicle comprising:
    an engine configured to operate in a start-stop mode; and
    a power management system configured to:
        receive an input requesting use of a snow plow in a snow plow mode; and
        responsive to the input, reduce an electrical load, disable the start-stop mode, and enable use of the accessory mode.

4. The vehicle of claim 1, wherein the electrical load comprises at least one of power seats, heated seats, climate control, fog lamps, and an AC/DC inverter of the vehicle.

5. The vehicle of claim 1, wherein the power management system comprises a battery and an alternator having a combined power output capacity, and wherein the power management system is further configured to:
    determine a power requirement of the vehicle accessory; and
    reduce the electrical load to cause an available power output to be larger than the power requirement of the vehicle accessory.

6. The vehicle of claim 5, further comprising electronic power assisted steering (EPAS), wherein the power management system is further configured to:
   determine a power requirement of the EPAS; and
   reduce the electrical load to cause an available power output to be larger than a combined power requirement of the vehicle accessory and the EPAS.

7. The vehicle of claim 1, wherein the power management system is further configured to:
   determine that the engine is off; and
   responsive to the input, start the engine.

8. The vehicle of claim 1, wherein the power management system configured to:
   determine that the vehicle has been cycled off and on; and
   responsively enable the start-stop mode.

9. A method comprising:
   receiving, by a power management system for a vehicle, an input requesting use of a vehicle accessory in an accessory mode; and
   responsive to the input, reducing an electrical load, disabling a start-stop mode of an engine of the vehicle, and enabling use of the accessory mode.

10. The method of claim 9, wherein the start-stop mode comprises stopping the engine while the vehicle is at rest, and restarting the engine upon release of a brake pedal of the vehicle.

11. A method comprising:
    receiving, by a power management system for a vehicle, an input requesting use of a snow plow in a snow plow mode; and
    responsive to the input, reducing an electrical load, disabling a start-stop mode of an engine of the vehicle, and enabling use of the accessory mode.

12. The method of claim 9, wherein the electrical load comprises at least one of power seats, heated seats, climate control, fog lamps, and an AC/DC inverter of the vehicle.

13. The method of claim 9, wherein the power management system comprises a battery and an alternator having a combined power output capacity, the method further comprising:
    determining a power requirement of the vehicle accessory; and
    reducing the electrical load to cause an available power output to be larger than the power requirement of the vehicle accessory.

14. The method of claim 13, further comprising electronic power assisted steering (EPAS), wherein the power management system is further configured to:
    determine a power requirement of the EPAS; and
    reduce the electrical load to cause an available power output to be larger than a combined power requirement of the vehicle accessory and the EPAS.

15. The method of claim 9, further comprising:
    determining that the engine is off; and
    responsive to the input, starting the engine.

16. The method of claim 9, further comprising:
    determining that the vehicle has been cycled off and on; and
    responsively enabling the start-stop mode.

* * * * *